United States Patent
Roth et al.

(10) Patent No.: US 8,275,472 B2
(45) Date of Patent: Sep. 25, 2012

(54) VARIABLE FIELD DEVICE FOR PROCESS AUTOMATION

(75) Inventors: Joerg Roth, Lörrach (DE); Eugenio Ferreira Da Silva Neto, Biel-Benken (CH)

(73) Assignee: Endress + Hauser Flowtec AG, Reinach (CH)

( * ) Notice: Subject to any disclaimer, the term of this patent is extended or adjusted under 35 U.S.C. 154(b) by 1418 days.

(21) Appl. No.: 10/514,412

(22) PCT Filed: May 15, 2003

(86) PCT No.: PCT/EP03/05130
§ 371 (c)(1),
(2), (4) Date: Jun. 29, 2005

(87) PCT Pub. No.: WO03/098154
PCT Pub. Date: Nov. 27, 2003

(65) Prior Publication Data
US 2005/0231348 A1    Oct. 20, 2005

(30) Foreign Application Priority Data

May 15, 2002   (DE) .................................. 102 21 772

(51) Int. Cl.
*G05B 13/02* (2006.01)
(52) U.S. Cl. .................. 700/28; 700/1; 700/29; 700/30; 700/32; 700/34; 713/1

(58) Field of Classification Search .................... 700/21, 700/23, 28, 79, 1, 20, 29, 30, 31, 32, 34; 713/1, 200, 202
See application file for complete search history.

(56) References Cited

U.S. PATENT DOCUMENTS

| | | | |
|---|---|---|---|
| 5,335,186 A | 8/1994 | Tarrant | |
| 6,032,109 A | 2/2000 | Ritmiller | |
| 6,351,212 B1 | 2/2002 | Lynch | |
| 6,424,567 B1 * | 7/2002 | Cline et al. | 365/185.04 |
| 8,102,869 B2 * | 1/2012 | Brown et al. | 370/419 |
| 2003/0208290 A1 * | 11/2003 | Gillen | 700/79 |
| 2005/0177708 A1 * | 8/2005 | Stinus et al. | 713/1 |
| 2006/0206218 A1 * | 9/2006 | Glanzer et al. | 700/18 |
| 2009/0271007 A1 * | 10/2009 | Brown et al. | 700/21 |
| 2010/0011311 A1 * | 1/2010 | Kodosky et al. | 715/771 |

FOREIGN PATENT DOCUMENTS

WO    WO 00/25095    5/2000

OTHER PUBLICATIONS

English abstract of DE 19502499.
English abstract of DE 4205524.

* cited by examiner

*Primary Examiner* — Hirdepal Singh
(74) *Attorney, Agent, or Firm* — Bacon & Thomas, PLLC

(57) ABSTRACT

In a field device for process automation, a reprogammable logic device is used, in order to achieve a high flexibility as regards hardware components.

10 Claims, 3 Drawing Sheets

VARIABLE FIELD DEVICE FOR PROCESS AUTOMATION

FIELD OF THE INVENTION

The invention relates to a variable field device for process automation.

BACKGROUND OF THE INVENTION

In the technology of automation and process control, field devices are used in many cases in the flow path of an industrial process for measuring (sensors) process variables or controlling (actuators) controlled variables.

Field devices for determining flow, fill status, pressure difference, temperature, etc. are generally known. For detecting the corresponding process variables mass, or volume, flow rate, fill level, pressure, temperature, etc., the field devices are most often arranged in the immediate vicinity of the relevant process component.

The field devices deliver a measured signal, corresponding to the value of the detected process variable. This measured signal is forwarded to a control unit (e.g. a programmable logic controller PLC, a control room or process control system PCS). Normally, the process control is accomplished by a control unit, where the measured signals of various field devices are evaluated and, on the basis of the evaluation, control signals are produced for the actuators, which control the course of the process.

In terms of an example of actuators, controllable valves can be mentioned, which regulate the flow rate of a liquid or a gas in a section of a pipeline.

Signal transmission between field device and control unit can occur in analog or digital form (e.g. current loop or digital data bus). Known international standards for signal transmission include 4-20 milliampere current loops, HART®, Profibus®, Foundation Fieldbus' or CAN-bus®.

The signal processing in the field device and the communication of the field device with the control unit or other field devices is becoming always more complex. To handle this, various hardware components with corresponding software are being implemented in the field device. The software, which runs as a sequential program in a microprocessor, is normally very flexible and can easily be replaced. The disadvantage in the use of software is that the data processing proceeds sequentially and, for this reason, it is relatively slow.

Hardware components, in contrast, have a determined functionality, which is hardwired in special chips, or integrated circuits (IC's). Examples of such are ASIC's (Application Specific Integrated Circuits) or SMD's (Surface Mounted Devices). These devices are very application-specific and can, for example, execute an FFT (Fast Fourier Transformation), which is very calculations intensive, very quickly. The disadvantage of these hardware components is that they are only flexible to a slight degree and normally must be replaced, in order to achieve a changing of the functionality.

The communication of the field device with a superordinated, evaluation unit occurs, likewise, over suitable hardware components partially still in analog fashion or over a digital data bus.

Each field device is normally composed of various hardware components, which determine the functionality of the field device. Different field devices, for instance Coriolis mass flowmeters or electromagnetic flowmeters (MID's), have entirely different hardware components. Even for one and the same field device, for example a Coriolis mass flowmeter, the hardware components for communications can differ, for example. For connection to a Profibus, a Profibus module is needed or connection to a Foundation Fieldbus, a Foundation Fieldbus-module, etc. Depending on whether the field device is to deliver a frequency, pulse or current signal, corresponding hardware components have to be provided.

This multiplicity of components means a considerable expense in manufacture, since a multitude of hardware components has to be available.

A trend in the case of field devices is that they should be always compacter. The components, especially the hardware components, are, therefore, always moving closer together on the circuit boards. A limit has almost been reached for this.

In order to assure the safety and the ability of a field device to function, the hardware components must be tested following the populating of the circuit boards. For test strategies to this point in time, a multitude of test pads are provided on the underside of the circuit board. These pads can be contacted using a so-called bed of nails. In this case, only certain circuit parts can be tested in isolation.

If, in the field, a Coriolis mass flowmeter is to be replaced by an electromagnetic flow meter, it is presently necessary to replace the entire field device.

SUMMARY OF THE INVENTION

An object of the invention is to provide a variable field device for process automation. It should not display the above-described disadvantages, it should be flexible, have a compact form of construction, be made of few parts, exhibit a high degree of safety and reliability, and simultaneously have a favorable cost and be easily manufacturable.

This object is achieved by a variable field device for process automation including: a sensor module SM for measured value detection; a signed processing module SPM connected to the sensor module SM; a processor module PM, connected to a communication module CU for connection of the field device with a superordinated control-evaluation unit, wherein the signal processing unit SPM and the processor module PM are provided in the form of a reprogrammable logic device LD.

An essential idea of the invention is that various modules of the field device are in the form of reprogrammable chips. Reprogrammable logic devices are very flexible and can be configured simply such that they can serve in the capacity of various hardware components.

Advantageous further developments of the invention are given in the dependent claims.

The invention will now be explained in greater detail on the basis of an example of an embodiment presented in the drawing, the figures of which show as follows:

DESCRIPTION OF THE PREFERRED EMBODIMENTS

Figure 1:
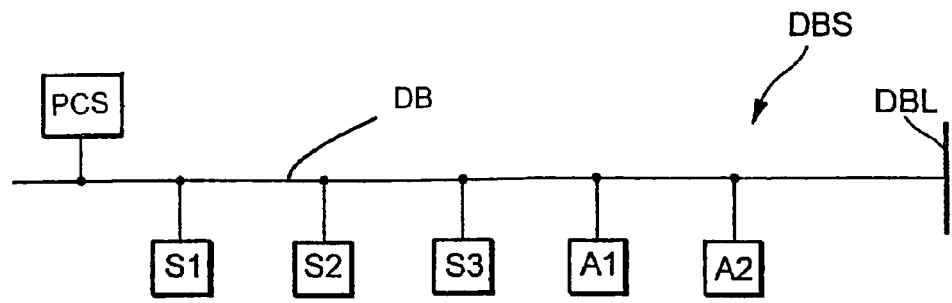
FIG. 1 is a data bus system in schematic presentation.

FIG. 1 shows a data bus system DBS including a plurality of field devices and a process control system PCS. The field devices include various sensors S1, S2, S3 and actuators A1, A2. The data bus participants (field devices and process control system) are connected with one another via a data bus DB.

The process control system is usually located in a control room, from which the entire process control occurs. The sensors S1, S2, S3 and the actuators A1, A2 are in the field, i.e. located at the individual process components (tank, filling equipment, pipeline, etc.). The sensors S1, S2, and S3 detect, for example, the process variables temperature, pressure or flow rate at the particular process components where they are located. The actuators A1 and A2, as valves, control the flow rate of a liquid or gas in a section of pipeline.

Data communication between process control system PCS, the sensors S1, S2, S3 and the actuators A1, A2 occurs in known manner according to internationally standardized transmission technologies (RS435, IEC1158) by means of special protocols (e.g. Profibus, Foundation Fieldbus, CAN-Bus).

Figure 2:
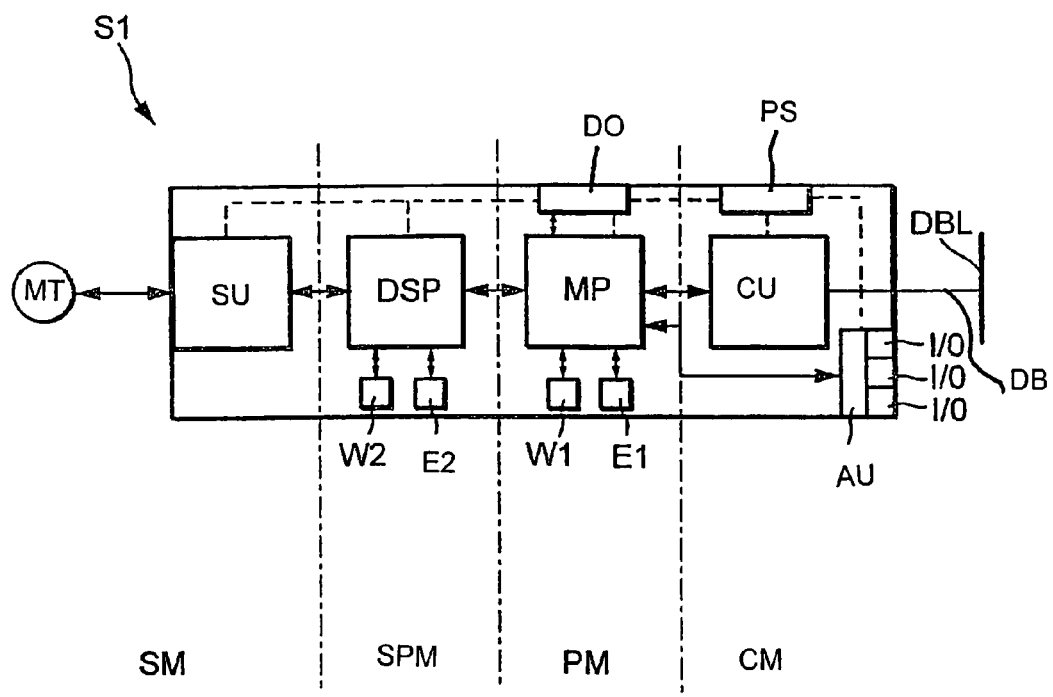
FIG. 2 is a schematic presentation of a conventional field device having various hardware components.

FIG. 2 shows a field device in the form of a typical sensor S1. Sensor S1 includes a measurement transducer MT, which is connected with a sensor unit SU. The sensor unit SU is followed by a digital signal processor DSP. The digital signal processor is connected with a system processor MP. The system processor MP is connected via a communications unit CU with the data bus DB. Furthermore, the system processor MP is connected with an analog unit AU, which has a plurality of inputs, outputs I/O. Serving for display of the measurement value and for manual input is a display and operating unit DO, which is likewise connected with the system processor MP. The power supply of the sensor S1 is cared for by a power supply unit PS, which is connected to the various hardware components of the sensor S1, as indicated by the dashed lines. Power supply can occur externally or over the data bus DB.

The digital signal processor DSP and the system processor MP are each connected with watchdogs W1, W2 and EEPROM memories E1, E2.

The measurement transducer MT serves for detecting the process variable for which it is intended and is based on, for example, a temperature-sensitive resistance or a pressure-sensitive piezo-element or two coils, which detect the tube oscillation of a Coriolis mass flowmeter. The analog signals of the measurement transducer MT are changed in the sensor unit SU into digital signals and further processed in the digital signal processor DSP and fed to the system processor MP as measured value. The system processor MP controls the entire sensor S1. Connection to the data bus DB occurs via the communications unit CU. The communications unit CU reads telegrams on the data bus DB and itself writes data onto the data bus DB. It supports all transmitting and receiving functions of the particular transmission technology which has been chosen for the application.

In principle, every field device has a sensor module SM, which includes the measurement transducer MT and the sensor unit SU, a signal processing module SPM, which can be e.g. the digital signal processor DSP, a processor module PM, which is essentially the system processor MP, and a communications module CM, which is either the communications unit CU and/or the analog unit AU.

Figure 3:
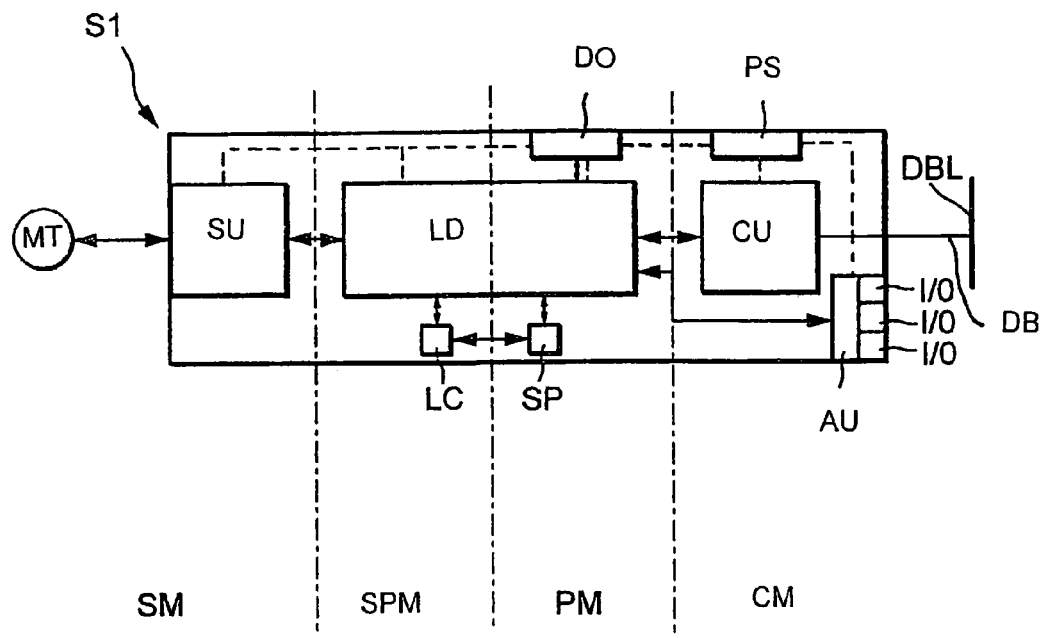
FIG. 3 is a schematic presentation of a field device of the invention.

FIG. 3 shows a first example of an embodiment of the sensor S1 of the invention. FIG. 3 essentially corresponds to FIG. 2, with the difference that the digital signal processor DSP and the system processor MP, including the watchdogs W1, W2 and the EEPROM's E1, E2 are replaced by a logic device LD. The logic device LD is additionally connected with a permanent memory SP (flash memory) and a loading, or booting, controller LC.

Figure 4:
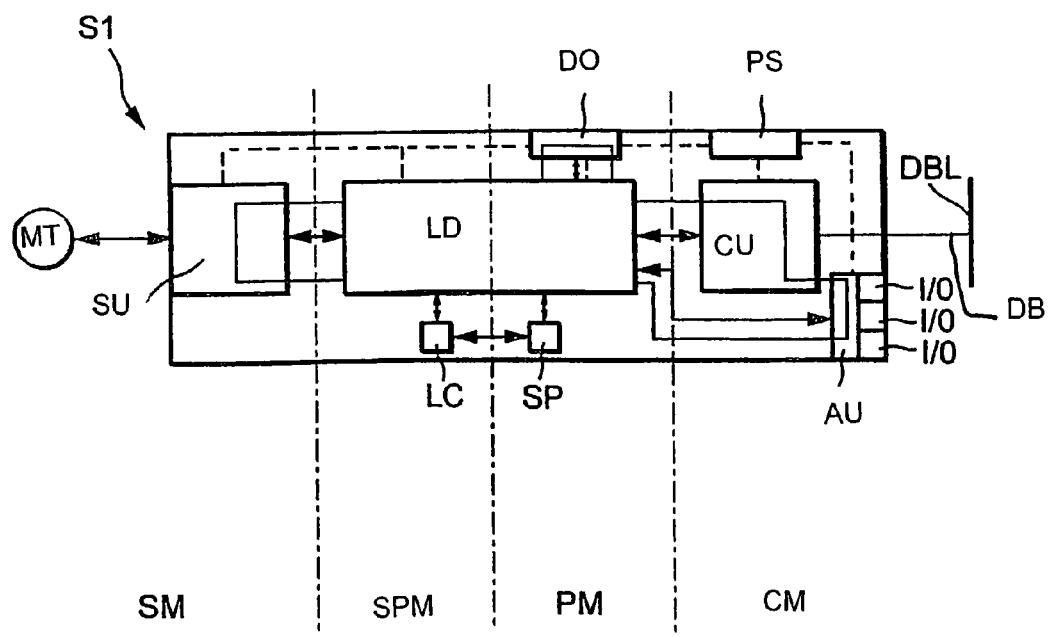
FIG. 4 is a schematic presentation of a reprogrammable logic device with flash memory.

FIG. 4 shows a further example of an embodiment. Here, the logic device LD includes not only the digital signal processor DSP and system processor MP, but also parts of the display of the operating unit DO, as well as the communications unit CU and parts of the analog unit AU and the sensor unit SU. In the case of this example of an embodiment, the logic device LD includes all digitally operating components of the sensor S. The outputs of the logic device LD serve only for activating the analog components of the sensor S1.

The logic device LD is a reconfigurable logic device, such as that available from the firm Altera under the mark Excalibur.

Figure 5:
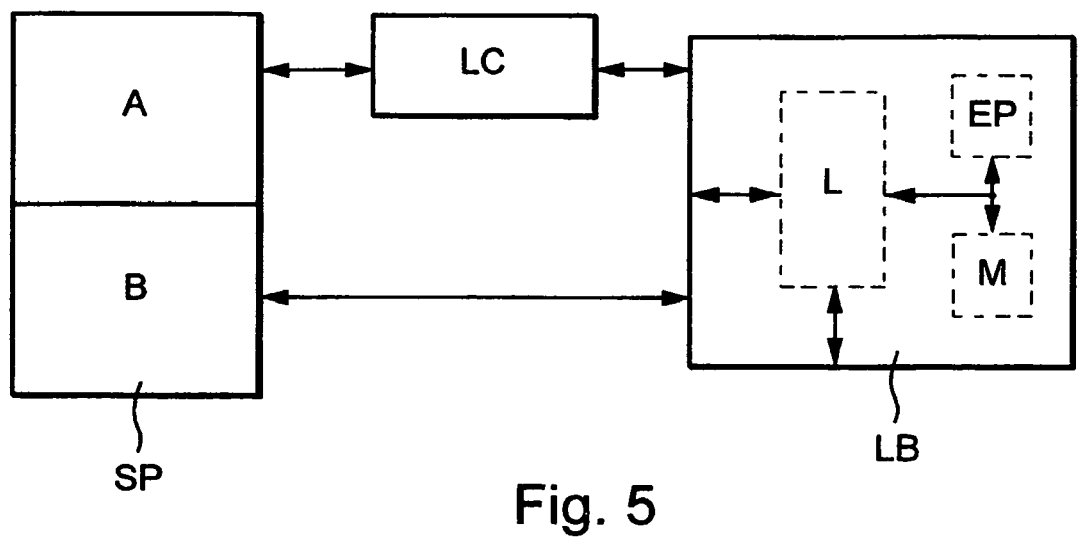
FIG. 5 is a schematic presentation of a logic device associated with memory and loading controller.

FIG. 5 shows the configuring of the logic device LD in greater detail. The memory SP is divided into two memory ranges A and B. Memory range A contains a description of the hardware of the logic device LD, while memory range B contains the sequential program for the embedded controller. On system start, the hardware of the logic device LD is configured with the help of the loading controller LC. At least one embedded processor EP, one memory M and one logic L are configured thereby. Once the hardware of the logic device is configured, the sequential program for the embedded controller is loaded into the memory M.

This procedure brings-out an essential advantage of the sensor of the invention, that, on system-start, both hardware and software can be configured in any desired fashion and matched thereby to the particular demands of the application.

In the industry, such logic devices are also designated as SOPC, or system-on-a-programmable-chip. By using a reconfigurable logic device LD, a Coriolis mass flowmeter can easily be replaced by an electromagnetic mass flowmeter MID, or any other field device. Necessary to do this is only the appropriate reconfiguring of the logic device LD at system-start by new memory information in the memory ranges A and B.

As shown in FIG. 4, parts of the communication module can also be integrated into the logic device LD. In this way, a sensor designed for the HART protocol can easily be transformed into a sensor suited for Profibus' or FF. For this, only the appropriate region of the logic device LD must be configured at system-start.

By using a reconfigurable logic device LD, the parts multiplicity burdening the manufacture of a field device is considerably reduced. A further advantage offered by the field device of the invention is that new test strategies are possible. In principle, any areas, i.e. functionalities, of the logic device LD can be isolated and monitored. To do this, the logic device needs only to be correspondingly configured, and the signals accessed at, and fed to, appropriate test points.

With the aid of reconfigurable logic devices, it is possible to configure hardware components, and, consequently, to change the functionality and behavior easily. The hardware components can, in this way, be adapted to various tasks and functionalities. Inputs and outputs, I/O's, can be easily defined. Especially, it is possible therewith to define and amend function blocks, e.g. Flexible Function Blocks (Foundation Fieldbus Organization), or Profibus' function blocks (Profibus' Organization) easily with respect both to hardware and software. The function block (Flexible Function Block or ProfibusR) is loaded into the reconfigurable logic device and generates its I/O's itself. In this way, a logic device LD can be used for various functionalities, just by loading the corresponding function blocks.

An essential idea of the invention is that use of a reconfigurable logic device makes it possible to embody field devices flexibly over a wide range of applications. The invention is, of course, not limited to just the area of field devices, but, instead, can be used also for sensors and actuators appropriate, for instance, in the field of motor vehicle manufacture.

The invention claimed is:

1. A variable field device for process automation, including:
   a superordinated control-evaluation unit;
   a sensor module SM for measured-value detection of a process variable in an application;
   a signal processing module SPM connected to said sensor module SM;
   a communication module CU; and
   a processor module PM, which is connected with said communications module CU for connection of the field device with said superordinated control-evaluation unit, wherein:
   said signal processing module SPM and said processor module PM are provided in the form of a reprogrammable logic device LD; and
   at system start, both hardware and software are configured on said reprogrammable logic device LD in a desired fashion thereby matching the particular demands of the application of said sensor module SM.

2. The variable field device as claimed in claim 1, wherein:
   said reprogrammable logic device LD includes parts of said communication module CU.

3. The variable field device as claimed in claim 1, wherein:
   said reprogrammable logic device includes parts of said sensor module SM.

4. The variable field device as claimed in claim 1, wherein:
   said reprogammable logic device LD includes all digitally working components of said sensor module SM.

5. The variable field device as claimed in claim 1, wherein:
   said reprogrammable logic device LD includes at least one embedded processor EP, one memory M and one logic L.

6. The variable field device as claimed in claim 1, wherein:
   said reprogrammable logic device LD serves, in operation, as an SOPC-system (system-on-a-programmable-chip).

7. The variable field device as claimed in claim 1, wherein:
   said communications module CU has a data bus interface, which comprise one of: Profibus®, Foundation Fieldbus®, and CAN®-Bus.

8. The variable field device as claimed in claim 1, wherein:
   said communications module CU has a data bus interface which comprises one of: one or more analog inputs/outputs I/O's, which are one of: frequency output, and pulse output.

9. The variable field device as claimed in claim 1, wherein:
   a function block is loaded into said reprogrammable logic device LD.

10. The variable field device as claimed in claim 9, wherein:
    said function block is a Flexible Function Block of one of: Foundation Fieldbus; and a Profibus function block.

* * * * *